L. WILLIAMSON.
SHOCK ABSORBING SHAFT COUPLING.
APPLICATION FILED JULY 23, 1913.
1,189,517.
Patented July 4, 1916.
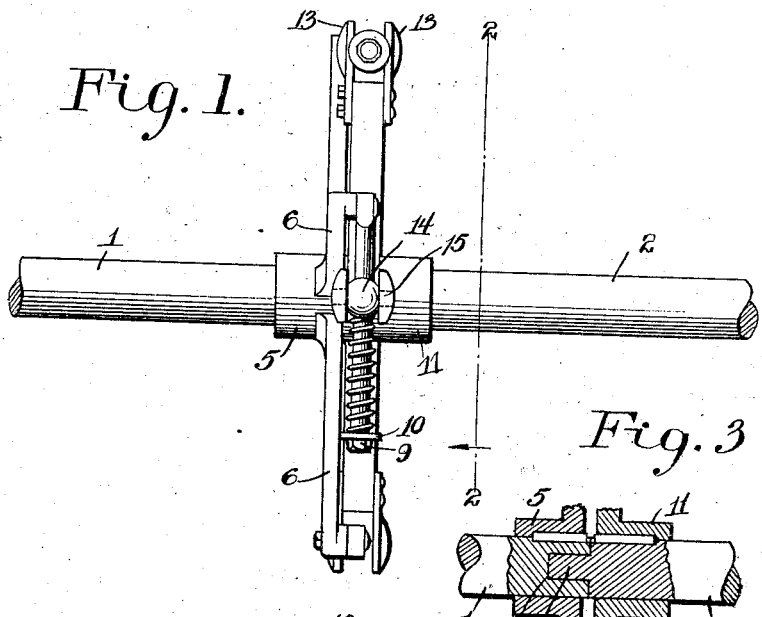
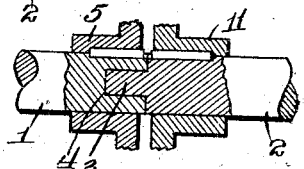
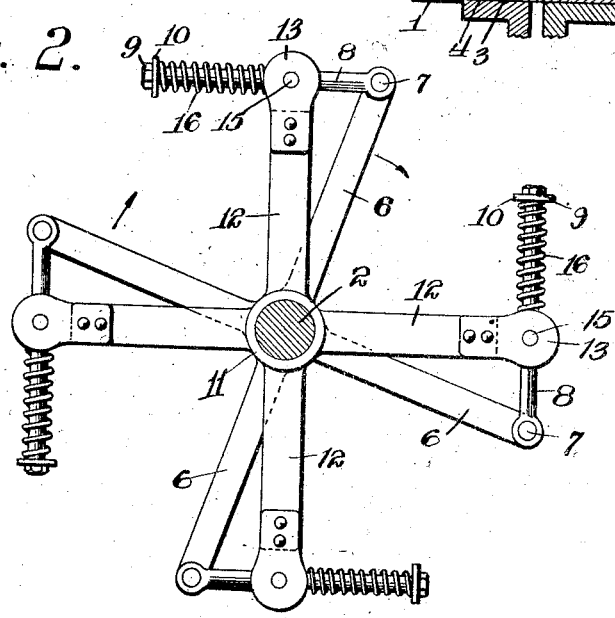
Witnesses
Wm. H. Mulligan.
C. H. Crawford
Inventor
Lee Williamson,
By Richard Bewen,
His Attorney

UNITED STATES PATENT OFFICE.

LEE WILLIAMSON, OF CACHE, OKLAHOMA.

SHOCK-ABSORBING SHAFT-COUPLING.

1,189,517.  Specification of Letters Patent.  Patented July 4, 1916.

Application filed July 23, 1913. Serial No. 780,791.

*To all whom it may concern:*

Be it known that I, LEE WILLIAMSON, a citizen of the United States, residing at Cache, in the county of Comanche and State of Oklahoma, have invented certain new and useful Improvements in Shock-Absorbing Shaft-Couplings, of which the following is a specification.

The object of my invention is to take up and absorb the shocks and jolts usually transmitted to an automobile in the operation of starting, and also when the drive wheels enter ruts or meet obstructions in the roadway, or for any other cause whereby the motor tends to unresistingly drive against a counteracting resistance.

It is one of the objects of my invention to provide a drive shaft formed in sections and to provide a shock absorber connected to the sections so as not only to resist rotation of the sections in the direction of drive, but also, to dispose the working elements of the device in such a manner that such resistance to relative rotation of the shaft sections will be equi-distantly applied circumferentially of said sections so as to relieve the shaft sections of twisting or torsional strains.

The device of my invention will be more fully described in connection with the accompanying drawings and will be more particularly pointed out in the appended claim.

In the drawings: Figure 1, is a view in side elevation of the sections of a motor driven shaft of an automobile showing the device of my invention applied thereto. Fig. 2, is a sectional view on line 2—2 of Fig. 1. Fig. 3, is a longitudinal sectional view showing the construction of the meeting ends of the shaft sections.

Like characters of reference designate similar parts throughout the different figures of the drawings.

As illustrated, 1, designates a shaft section extending from the motor, and which may be hereinafter termed the drive section, and 2, designates the shaft section adapted to be coupled by the device of my invention to the drive section, and which may be hereinafter termed the driven section, and which driven section extends toward and will be operatively connected with the drive axle of the machine. However, inasmuch as the present invention resides wholly in the shock absorber for the shaft, I have not found it necessary to illustrate additional parts.

The drive section 1, is disposed in alined relation with the driven section 2, and in order to maintain the meeting ends of the sections in axial relation, one section which may be section 2, is provided with a stud 3, adapted to fit in a correspondingly formed socket 4 in section 1. I do not wish to be limited to any special means of holding the meeting ends of the sections in axial relation, as they may be sleeved or adjacent bearings may be provided for this purpose. Furthermore, I have not shown any means for preventing longitudinal separation of the shaft sections as reliance may be placed upon the usual bearings for preventing such movement.

On the drive section 1, a hub 5, is keyed or otherwise non-rotatably secured, and the hub 5, is provided with a plurality or set of arms 6, which radiate from the hub and are spaced in equi-distant relation with respect to each other. In the form shown, four arms 6, are provided and the same are disposed at angles of 90 degrees with respect to each other. On the outer end of each arm there is pivotally mounted at 7, a suitable rod 8, having an abutment on its end which may take the form of a nut and washer 9 and 10.

On the driven section 2, I key or otherwise non-rotatably mount a hub 11, having a set or plurality of arms 12, which are disposed in equi-distantly spaced relations with respect to each other and which are four in number. On the outer ends of the arms 12, I provide bearing extensions 13 in which are journaled rod bearings 14. The bearings 14, are provided with trunnions 15, which are journaled in the openings in the bearing extensions 13, so as to be rotatable therein.

The rods 8, extend through the bearings 14, and are slidable therein, and the bearings 14, form spring abutments between which and the rod abutments 9 and 10, expansively acting springs 16, are interposed. I have shown the springs 16, in the form of coiled springs which encircle the rods 8. Assuming that the drive is in the direction of the arrow indicated in Fig. 2, it will be seen that the springs 16, will be placed under compression when the motor shaft section 1, is rotated so that the arms 6, will rotatably advance the arms 12, and thereby the driven section 2. Thus, the springs will tend to resist the independent rotation of the shaft section 1, with respect to the shaft section 2, in the direction of drive. Adjustment is afforded by the nuts 9, so that all of the springs will be under an equal tension and as the spring devices are equi-distantly spaced about the shaft sections, it will be seen that there will be no tendency to shift the meeting ends of the shaft sections out of alined relation as the springs themselves will, by reason of their equi-distant disposition, serve to maintain the meeting ends of the shaft sections in alinement.

While I have herein shown and described one specific form of my invention, I do not wish to be limited thereto except for such limitations as the claim may import.

I claim:

A shock absorbing shaft coupling including in combination, a drive shaft composed of driving and driven sections disposed in alined relation, a collar rigidly mounted on each of the sections adjacent the meeting ends thereof, a set of arms radiating from each collar at diametrically opposite points and also at an angle of 90° with respect to each other, a rod pivoted to each of the arms of one section, bearing extensions arranged on the respective faces of the outer end of each of the arms of the other section, a bearing pivoted between said extensions of each said other section for guiding the free end of one rod therethrough, removable abutments adjustably associated with the free ends of said rods, and coil springs disposed about said rods and having the respective ends thereof bearing against said bearings and said abutments so that resistance to relative rotation of the shaft sections will be equidistantly applied circumferentially of said sections to relieve the said sections of a twisting strain.

In testimony whereof I affix my signature in presence of two witnesses.

LEE WILLIAMSON.

Witnesses:
C. J. CLINGON,
HENRY GOINS.